Jan. 31, 1967  A. ASHKIN ET AL  3,301,625
SEMICONDUCTOR LIGHT MODULATORS
Filed June 23, 1964  4 Sheets-Sheet 1

INVENTORS A. ASHKIN
M. GERSHENZON
BY
David P. Kelley
ATTORNEY

Jan. 31, 1967  A. ASHKIN ET AL  3,301,625
SEMICONDUCTOR LIGHT MODULATORS
Filed June 23, 1964  4 Sheets-Sheet 3

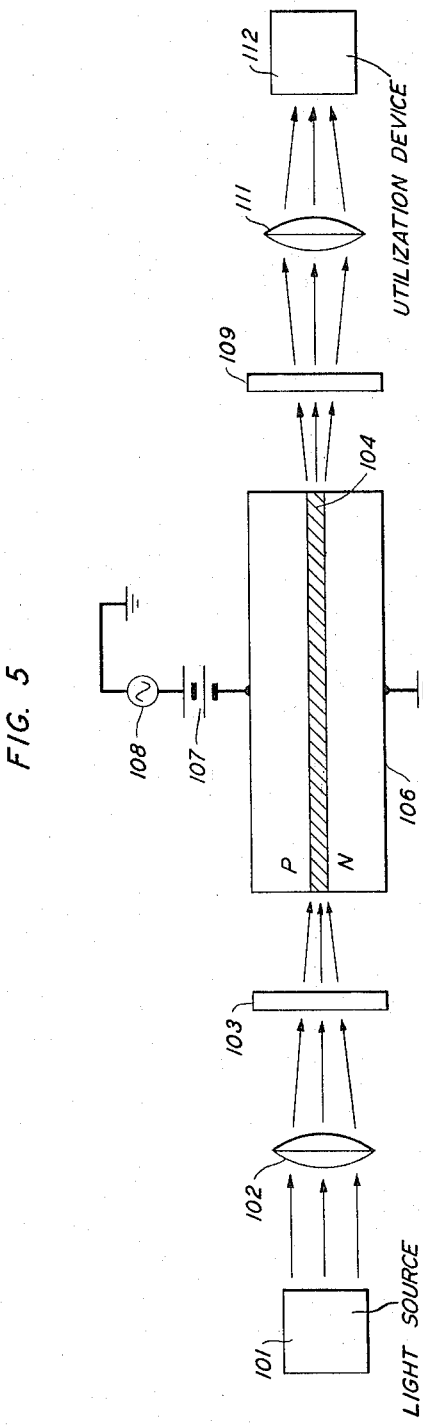

United States Patent Office 3,301,625
Patented Jan. 31, 1967

3,301,625
SEMICONDUCTOR LIGHT MODULATORS
Arthur Ashkin, Bernardsville, and Murray Gershenzon, Morris Plains, N.J., assignors to Bell Telephone Laboratories, Incorporated, New York, N.Y., a corporation of New York
Filed June 23, 1964, Ser. No. 377,367
3 Claims. (Cl. 350—150)

The invention of this application, which is a continuation-in-part of U.S. patent application Serial No. 265,511, filed March 15, 1963, of A. Ashkin and M. Gershenzon, relates to modulation of electromagnetic radiation in the optical frequency range, and, more particularly, to such modulation utilizing semiconductor devices characterized by having a junction separating regions of different conductivity type.

The invention of the optical maser, or laser, which generates coherent light waves, has greatly expanded the bandwidth available for communication purposes, for example. However, to make full use of this bandwidth, it has been necessary to devise new types of modulation schemes capable of modulating the light energy at extremely high frequencies. As a consequence, many workers in the art have been working toward this end, and many schemes have been proposed. In general, however, the simplicity of the modulation arrangement and the attainment of high modulation frequencies have been incompatible, making it necessary usually to establish a compromise. Some modulation arrangements quite often tend to attenuate or otherwise dissipate the incident light energy to a large extent, requiring subsequent stages of amplification which, ideally, should not be necessary. Other modulation arrangements depend upon mechanical operations, which, quite obviously, place an upper limit on modulation frequencies that is unacceptable. Other modulation arrangements require exceedingly high powers.

It is an object of the present invention to produce high frequency modulation of light in an arrangement that is both simple and easily constructed.

It is another object of the present invention to produce high frequency modulation of light utilizing a semi-conductor as the modulating element in a manner that minimizes light losses or attenuation, and does not require high powers.

The present invention is based upon the realization that the depletion layer of a p-n junction has, for certain materials, a thickness comparable to the wavelength of light and also has a significantly different index of refraction from that of the surrounding semiconducting medium. By virtue of these qualities, the junction is capable of producing sizable reflections when light energy is directed so as to be incident on the junction at a small angle. In addition, if the light is directed into the depletion layer at the proper angle, where the depletion layer has a higher index of refraction than the surrounding medium, the light is trapped within the depletion layer and propagates along the junction. Under these conditions, the depletion layer acts as a dielectric waveguide for the light energy. In these cases and where light is incident upon the junction so that reflection occurs, the plane of polarization of the light can be made to change in a manner that can be utilized for modulating purposes.

When a bias is applied across a p-n junction, the width of the depletion layer changes. Thus a varying bias gives rise to a depletion layer of varying width. This variation is most pronounced for a reverse biased junction. On the other hand, a forward bias on the junction produces a change in the index of refraction of the depletion layer, thereby changing its reflectivity. It is also possible, as will be explained hereinafter, with proper bias, to vary the number of free charge carriers in the junction region, and to vary the electrical field strength across the junction so as to vary the degree of energy absorption in the junction region. As will be explained more fully hereinafter, these aforementioned effects can be utilized in various ways to produce exceedingly rapid modulation of a light beam, with substantially no loss in light energy.

The objects of the invention are achieved in a first illustrative embodiment thereof wherein a semiconductor p-n junction diode of suitable material, such as, for example, gallium phosphide, has the surface of the p type material ground and lapped to form an angle $\epsilon$ with the junction. Both the p and n type materials are transparent to radiation at optical frequencies. Means are provided to reverse bias the diode, and a modulating potential is applied across the junction. Regarded from a qualitative standpoint, when light from a suitable source is directed through the n type material toward the junction so as to impinge upon the junction at an angle $\theta$, a portion of the light passes through the junction and is reflected from the angle cut face of the p type material, emerging from the diode at an angle $\theta-2\epsilon$ to the plane of the junction. In addition, a portion of the light is reflected by the first face of the junction because of the difference in index of refraction and emerges from the diode at an angle $\theta$ to the plane of the junction. A second portion is reflected from the other junction face, and also emerges from the diode at an angle $\theta$ to the plane of the junction. This second portion is, however, shifted in phase relative to the first portion. As the modulating voltage varies the thickness of the depletion layer, the point at which light is reflected therefrom is shifted, with a resultant variation of phase shift between the two emergent beams. The variations in phase shift produce additive and subtractive effects to produce an intensity modulation in the radiation pattern of the beam produced by the combination of the two beams. That portion of the beam reflected from the angle cut face also is modulated as a result of the varying intensity of the junction reflected beam, and is separately usable as a modulated beam. Suitable detecting means are provided for detecting the modulation on the emergent beams.

In a second illustrative embodiment of the invention quite similar to the first, the junction is biased so that the modulating voltage produces a variation in bandgap absorption in the depletion layer. As a consequence, and as will be explained more fully hereinafter, a plane polarized incident wave is converted to an elliptically polarized reflected wave, which is then detected by a suitably oriented polarizer or other suitable means.

In a third illustrative embodiment of the invention, first and second junction diodes are formed in a double mesa arrangement so that the junctions are axially aligned. By application of the proper exciting voltage across the first junction, i.e., the first mesa, it can be made to function as an optical maser. Inasmuch as the depletion layer functions as a dielectric waveguide, the generated light energy is emitted out the end of the junction and directed into the second junction. A reverse bias and a modulation potential are applied across the second junction, producing a variation in width of the depletion layer, which also functions as a dielectric waveguide. As a consequence, all of the radiant energy from the first junction incident upon the second junction is transmitted therethrough and is modulated in intensity by the variations in width of the depletion layer of the second junction. Suitable means for detecting intensity modulations can be provided at the receiver to reproduce the modulating signal.

In a variation of this third embodiment of the invention, the junction are of curvilinear shape so that background radiation from the first, or light generating junction, is not transmitted through the second junction.

In another variation of this third embodiment, the maser diode and the modulating diode are separated from each other by an antireflection coating. An apertured member is placed adjacent the output of the modulating diode to give, in a manner to be more fully explained, an enhanced intensity modulation of the emergent beam.

In still another illustrative embodiment of the present invention, the end forces of the diode are cut to form Brewster angles, which are polarization sensitive, and coated with antireflective coatings. Light incident upon the input face of the diode is transmitted through the depletion layer to the output face, and is intensity modulated by variations in the thickness of the depletion layer in the manner discussed heretofore. Such an arrangement eliminates the need for polarizers.

In still another illustrative embodiment of the invention, polarized light passing through the junction is modulated by rotation of its plane of polarization. The light emerging from the junction is, therefore, phase modulated. When passed through a polarized analyzer, the resultant light beam is amplitude modulated.

The principles and features of the present invention will be more readily understood from the following detailed description, taken in conjunction with the accompanying drawings, in which:

FIG. 3b is a diagrammatic representation of a portion of the arrangement of FIG. 3a;

FIG. 3c is an alternative arrangement for the system of FIG. 3a;

FIG. 3d is another alternative arrangement for the system of FIG. 3a;

FIG. 5 is still another embodiment of the invention depicted schematically.

Figure 1:
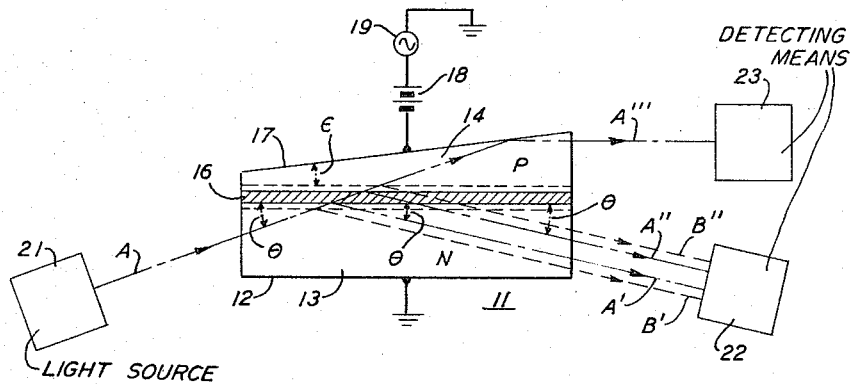
FIG. 1 is a schematic depiction of a first preferred embodiment of the invention.

Turning now to FIG. 1, there is depicted a modulation arrangement 11 which utilizes the difference in dielectric constant of a junction from that of the surrounding medium and the variation in width of the junction with applied voltage to produce a modulated light beam.

Arrangement 11 comprises a semiconductor diode 12, having a region of n type conductivity and a region 14 of p type conductivity separated by a junction 16. The diode may be of any suitable material such as gallium phosphide, properly doped. Both the n type and the p type regions are substantially transparent to light of the wavelength of operation, thus the operating light wavelength is one factor in determining the type of material of which the diode is made. The upper face 17 of the p type material is ground to form an angle $\epsilon$ with the plane of the juntion 16. Angle $\epsilon$ may be varied over a wide range, depending upon certain factors, which will become apparent hereinafter. The diode 12 is reverse biased by a source of bias potential 18 connected to the p type material, while the n type material is connected to ground. It is to be understood, of course, that these connections may be reversed, if desired. A source 19 of modulating voltage is connected in series with the source 18. Source 19 may be any one of a number of signal sources, and is shown here, merely for illustration, as a simple alternator.

A light source 21 for directing a beam of light to be modulated at the diode is oriented so that its emitted beam A is incident on the lower face of junction 16 at a grazing angle $\theta$. Because of the fact that junction 16, or, more appropriately, the depletion layer formed in the region of junction 16, has a different index of refraction from n type material 13, a portion of beam A is reflected from the lower face of the depletion layer, as indicated by the line A'. The remainder of beam A passes through the depletion layer which is of the order of a wavelength in thickness, being shown here of exaggerated thickness, for illustrative purposes, until it strikes the upper face of the depletion layer where again, because of the discontinuity, a portion is reflected, as depicted by line A''. By virtue of the slightly greater distance traveled by reflected beam A'', there is a slight phase change of this beam relative to beam A'. There is also an exceedingly slight displacement between beams A' and A'', but it is so small as to be negligible, and beams A' and A'' may be considered as a single beam.

The remaining portion of beam A passes through the depletion layer and strikes face 17 of the p type material, where it is reflected and emitted from the diode as indicated by line A''', which forms an angle $\theta - 2\epsilon$ with the plane of the junction 16. It can be seen that the beam A''' is widely separated from that formed by A' and A'', and is directed at a different angle. This angle may be varied to suit any particular application by changing the angle $\epsilon$.

In operation, let us assume that source 19 supplies a momentary negative voltage, such as a negative pulse. This voltage, when added to the negative voltage of source 18, widens the depletion layer as indicated by the dotted lines. A typical example, for a gallium phosphide junction with a .1$\mu$ depletion layer is that a ten volt change across the junction widens the depletion layer width from one-tenth micron to two-tenths micron. When this occurs, the incident beam A is reflected, as depicted by the lines B', B'', and A'''. It can be appreciated that the phase shift that existed between A' and A'' has been altered. Such variations in phase shift produce additive and subtractive effects between the two portions of the emergent beam, with the net result that the emergent beam is intensity modulated. A suitable detecting means, which may take any one of a number of forms known in the art, receives the modulator beam.

Because there has occurred a modulation of beams A'B' and A''B'', there is necessarily a modulation of beam A'''. This beam may be directed toward a suitable detecting means 23 for utilization also.

From the foregoing, it can be seen that little or no incident light power has been wasted, and yet modulation is achieved in a remarkably simple structure. By utilizing reverse bias, only very small amounts of power are consumed to achieve the desired modulation.

Figure 2:
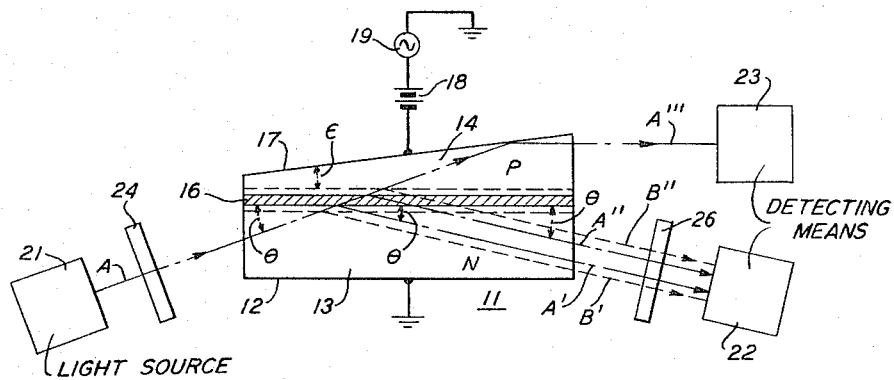
FIG. 2 is a schematic depiction of a second preferred embodiment of the invention.

In FIG. 2, there is depicted a second embodiment of the invention which is structurally quite similar to the embodiment of FIG. 1. For simplicity, elements in FIG. 2, which are the equivalent of like elements in FIG. 1, have been given the same reference numerals.

While the arrangement of FIG. 2 is structurally similar to that of FIG. 1, it makes use of an additional junction phenomenon as well as the reflection phenomenon to produce a more enhanced modulation of the light beam. When a junction diode is properly biased in the reverse direction, the losses in the depletion layer can be made to differ from those of the p and n portions of the diode by application of a modulating voltage of sufficient strength. This variation in loss difference results from a shift in bandgap absorption of the depletion layer due to the change in electric field.

In the arrangement 11 of FIG. 2, a light beam A is directed from source 21 through a polarizer 24 to impinge upon the depletion layer of junction 16 at an angle $\theta$. The polarizer 24 insures that beam A, as it impinges on the depletion layer has a single, or plane, polarization. When the modulating voltage from source 19 is applied, the reflection phenomenon, described qualitatively in connection with FIG. 1, occurs so that emergent beams A'', B'' are phase shifted relative to emergent beams A', B'.

Because of the variation in electric field across the depletion layer produced by the modulating voltage, the bandgap absorption of the depletion layer is shifted, so that losses in the depletion layer vary relative to losses in the n and p layers. As a consequence, considered qualitatively the magnitude of the E vector of beams A'', B'' vary relative to those of beams A', B'. Considering these two beams as a single beam, as was discussed in regard to the embodiment of FIG. 1, it can be seen that there results a single emergent beam of elliptical polarization. It is well known that reflections from a lossy medium can result in such a polarization. This emergent beam passes through polarizer 26 which produces a phase polarized beam. Because the emergent beam has an elliptical polarization, the beam that emerges from polarizer 26 will have a large amplitude modulation. Polarizer 26 can be adjusted to maximize this modulation, which then is detected in detector 22, which may take any one of a number of forms known to workers in the art.

Figure 3A:
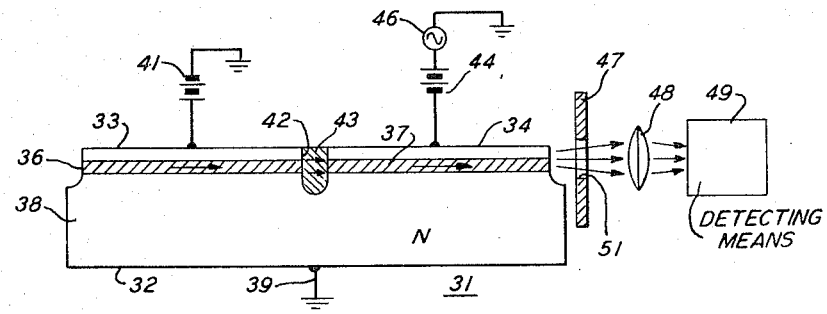
FIG. 3a is a schematic depiction of a third preferred embodiment of the invention.

In the foregoing embodiments of the invention, operability was predicated upon the difference of index of refraction between the depletion layer and the surrounding medium to produce a reflected, modulated beam. In FIG. 3a, there is shown an arrangement 31 wherein this difference in index of refraction is utilized to produce a guided light wave which, as will be apparent hereinafter, may be controlled to produce a modulated output beam.

Modulating arrangement 31 comprises a double mesa diode construction 32 having first and second mesas 33 and 34 of p type material forming junctions 36 and 37 and a base member 38 of n type material. Base member 38 is connected to ground through lead 39, and mesa 33 has applied thereto a forward bias from a source 41. As is well known, if a sufficiently high forward potential is applied across the junction of a diode of material, such as gallium arsenide or gallium phosphide, the diode will generate coherent light. The amount of biasing potential required depends upon the type of material used, inasmuch as the threshold of laser oscillation varies with the particular material. In the device of FIG. 3a, it is to be understood that source 41 supplies a voltage sufficiently in excess of the threshold value to produce coherent light in junction 36. Mesa 34 which, with junction 37, forms a modulator for the light generated by junction 36, is separated from mesa 33 by a gap 42. In order that impedance discontinuities may be minimized, gap 42 is preferably filled with an impedance matching glass 43 or other suitable material, so that reflections are held to a desirable level.

As has previously been pointed out, the index of refraction of the depletion layer at junction 37 differs considerably from that of either the p or n type material. Consequently, it has been found that when light is directed into such a junction as in the manner depicted in FIG. 3a, the light is effectively trapped within the confines of the depletion layer, which functions as a dielectric waveguide. It is to be understood that not all of the light is carried within the depletion layer itself, just as in the case of conventional dielectric waveguides, not all of the electromagnetic energy travels within the guide, even though it is effectively bound to and guided by the waveguide. The amount of light actually carried within the guide itself can be varied by varying the width of the depletion layer. To this end, a source 44 of voltage is connected to mesa 34 to produce a bias at junction 37, and a source of modulation potential 46 is connected in series with source 44.

Adjacent the output end of junction 37 is an aperture member 47 of opaque material, a lens or focusing member 48, and a detector or utilization device 49.

Figure 3B:
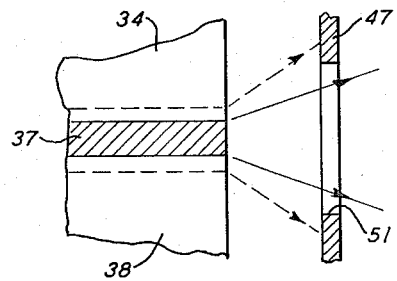

The operation of the arrangement 31 of FIG. 3a may best be understood with reference to FIG. 3b. As the light beam from junction 36 passes through the depletion layer of junction 37, the width of the depletion layer is varied as the modulating voltage is applied. Assume, for example, that the source 46 of modulation signals applies a negative voltage to junction 37. Under such conduction, the depletion layer is widened, as shown by the dotted lines in FIG. 3b, and more of the light is concentrated within the depletion layer than in the adjacent p and n materials. When this occurs, the radiation pattern of the emergent beam is changed from one contained substantially between the solid lines in FIG. 3b to one contained substantially between the dotted lines. The diameter of aperture 51 in member 47 is so chosen that at a particular value of modulating voltage, a sizeable portion of the beam is intercepted by member 47, with a net result that less light passes through aperture 51 to be focused by lens 48. It can be appreciated that the result is a light beam modulated in intensity that reaches device 49 for utilization. Proper choice of aperture diameter and location permits a wide degree of latitude in setting the desired percentage of modulation of the beam.

Figure 3C:
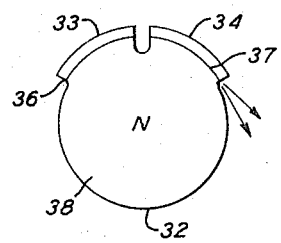

In the arrangement of FIG. 3a, some light emerging from junction 36 is scattered to the extent that it is not trapped by junction 37. Because of the straight line configuration of junction 37, this scattered light appears as undesirable background illumination at the output of junction 37. In FIG 3c there is shown a double mesa configuration for eliminating this background illumination. For simplicity, the various voltage sources, light sources, polarizers, and detectors have not been shown, it being understood that the double mesa diode of FIG. 3c can be directly substituted for that of FIG. 3a. The device 32 of FIG. 3c comprises a double mesa structure grown on a member 38 of cylindrical cross section. With such an arrangement, the scattered light emerging from junction 36 will follow a straight line path, whereas the light trapped by junction 37 will follow a curved path to emerge from the end thereof without the undesirable background illumination. The radius of curvature of the junction should not be too great, in which event the light will not be trapped and guided. However, it is possible to impart sufficient curvature to eliminate the undesired background illumination and still achieve the desired waveguide action.

Figure 3D:
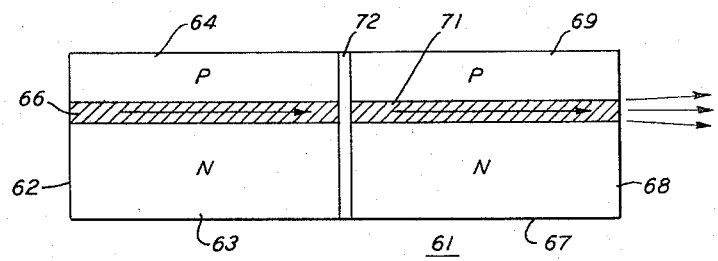

The arrangement of FIG. 3a is particularly advantageous because of the fact that the junctions are properly aligned with each other. However, it is difficult to create a double mesa structure in which the gap 42 is sufficiently narrow to present a minimum discontinuity to the light emerging from junction 36. In FIG. 3d, there is shown an alternative arrangement for that of FIG. 3a. For simplicity, the various voltage sources, detectors, and the like have not been shown, the device 61 of FIG. 3d being directly substitutable for device 32 of FIG. 3a.

In FIG. 3d, there is depicted a laser-modulator combination comprising a first diode 62 having an n type region 63 and a p type region 64 forming a junction 66. Diode 62 may be of any suitable semiconductor material, such as gallium arsenide, which will act as an optical maser under the application of a proper voltage bias. Arrangement 61 also includes a second diode 67 having an n type region 68 and a p type region 69 forming a junction 71. Diode 67 may be of any suitable material, such as an alloy of gallium phosphide and gallium arsenide, or gallium phosphide alone.

In order that light scattering be held to a minimum and reflections controlled, it is desirable that the separation between diodes 62 and 67 be minimized. To this end a thin layer 72 of impedance matching material, such as glass of the proper index of refraction is interposed between diodes 62 and 67. Because the faces of the diodes can be ground to optical flatness, and the layer 72 can be made of the order of a wavelength or less, light scattering can be minimized and background illumination is not a serious problem. In addition, the use of two separate diodes permits a choice of materials, i.e., one that generates light efficiently for diode 62 and one that responds rapidly to modulation voltages for diode 67. The modulation phenomenon is the same as described in connection with FIG. 3a.

In the various arrangements thus far shown, in many instances the modulation efficiency can be enhanced through the use of polarizers, at the input and output of the modulator. In the arrangements of FIGS. 3a, 3c, and 3d, the light generating diode produces a polarized output, hence a polarizer at the output of the modulating diode is all that is needed. Although such polarizers have not been shown in all cases, it is to be understood that their inclusion is within the purview of the invention.

Figure 4:
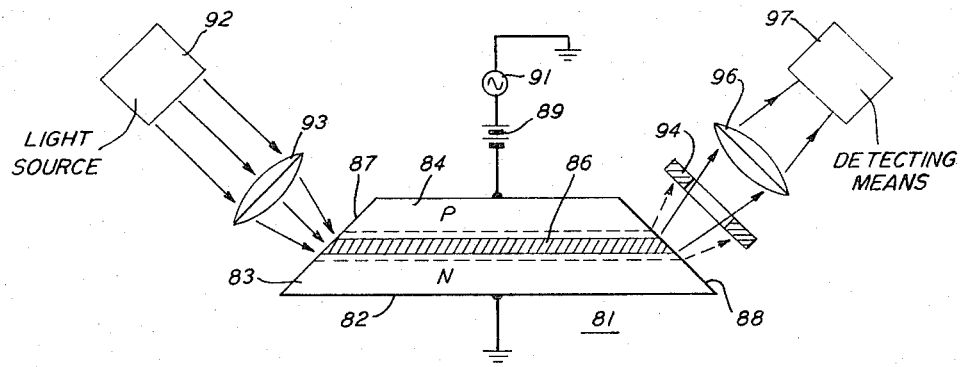
FIG. 4 is another preferred embodiment of the invention depicted schematically.

In the foregoing embodiments, the light to be modulated was generally considered as being generated by a source of coherent light. The various embodiments of the invention also function with incoherent light. It is highly desirable, when incoherent light is used, that polarizing means be used to produce plane polarized light for introduction into the depletion layer of the modulator, and also at the output of the depletion layer of the modulator. In FIG. 4, there is depicted a modulating arrangement 81 in which the use of such polarizers is not necessary.

Modulating arrangement 81 comprises a diode 82 having an n type layer 83 and a p type layer 84 forming a junction 86. Diode 82 may be of any suitable material, such as gallium phosphide, where the depletion layer is of the order of a wavelength and varies in width appreciably with variations in voltage across the junction. Input face 87 and output face 88 of diode 82 are both cut at an angle approximating the well known Brewster angle. A source 89 of bias voltage is connected to diode 82 so as to produce a reverse bias across junction 86, and a source 91 of modulating voltage is connected in series with the bias source.

Light to be modulated is directed from a source 92 and focused by means 93 onto junction 86, where it is trapped and propagates along the junction. This propagating light is modulated in the same manner as discussed in connection with the modulator of FIG. 3a, i.e., through changes in the width of the depletion layer in conjunction with an apertured member 94. The light emerging from member 94 is focused by means 46 on a suitable detecting or utilization means 97. Inasmuch as the end faces 87 and 88 are cut at angles approximating the Brewster angle, they are polarization sensitive, and the light entering and leaving the junction is plane polarized. Thus the need for separate polarization means is obviated.

As was pointed out in the foregoing, the plane of polarization of light propagating along the junction is rotated under the influence of a modulating voltage across the junction. The arrangement of FIG. 4 produces an amplitude modulated beam even in the absence of member 94, because of the polarization sensitivity of face 88 of device 82 inasmuch as the light exiting through face 88 varies as its polarization. In FIG. 5, there is shown an arrangement which utilizes this polarization rotation effect to produce a modulated beam.

The arrangement of FIG. 5 comprises a light source 101, the light output of which is directed through a focusing lens 102, a polarizer 103, and into the junction 104 of a p-n junction diode 106. Diode 106 may be of any suitable material, such as gallium phosphide. A source of bias voltage 107 is connected to diode 106 so as to produce a reverse bias across junction 104, and a source 108 of modulating voltage is connected in series with the bias source 107. The light emerging from junction 104 is directed through a polarized analyzer 109 and through a focusing lens 111 to a utilization device 112 which may be, for example, a photodetector.

In operation, the light from source 101 is polarized by polarizer 103. Obviously, if the output of source 101 is a polarized light beam, polarizer 103 is not necessary. In traveling along junction 104, the plane of polarization of the light is rotated under the influence of the modulating voltage from source 108, the amount of rotation varying with the modulating voltage. The light output from junction 104 is, therefore, a beam having a varying polarization. Analyzer 109 passes varying amounts of light depending on the polarization of the incident light. Hence, the output from analyzer 109 is an amplitude modulated light beam. If suitable phase detecting apparatus is available, it is not necessary to convert the polarization modulation to amplitude modulation and analyzer 109 is then not necessary.

From the foregoing, it can be appreciated that there are shown a plurality of modulating arrangements of simple construction, requiring small amounts of power, and capable of operating at great speeds. Numerous changes or other embodiments may be conceived by workers skilled in the art. For example, forward biased junctions can be made to function as modulators utilizing the principles of the present invention. Such changes, or other embodiments utilizing the foregoing principles, would fall within the spirit and scope of the present invention.

What is claimed is:

1. A light modulator comprising a member of semiconducting material having regions of p type and n type conductivity forming a longitudinally extending junction, means for applying a reverse bias to said junction, means for directing a polarized beam of light into said junction for propagation therealong, means for varying the polarization of the light propagating along said junction in accordance with a modulating signal, and means for detecting the amount of polarization variation.

2. A light modulator as claimed in claim 1 wherein said means for detecting the amount of polarization variation comprises a polarization analyzer.

3. A light amplitude modulator comprising a member of semiconducting material having regions of p type and n type conductivity, forming a junction, means for applying a reverse bias to said junction, a light beam source for directing a beam of light through said junction in the plane thereof, polarization means between said source and said junction for polarizing said beam, means for varying the polarization of said light beam in said junction comprising means for applying a modulating voltage across said junction, a polarization analyzer in the path of the beam exiting from said junction and utilization means in said beam path beyond said analyzer.

References Cited by the Examiner
UNITED STATES PATENTS 2,929,923   3/1960   Lehovec _____ 88—61

JEWELL H. PEDERSEN, *Primary Examiner.*
RONALD L. WIBERT, *Examiner.*
E. S. BAUER, *Assistant Examiner.*